United States Patent [19]

Evans et al.

[11] Patent Number: 5,232,964
[45] Date of Patent: Aug. 3, 1993

[54] TINTABLE ABRASION RESISTANT COATING COMPOSITIONS

[75] Inventors: Chana W. Evans, Saginaw; Anthony Revis, Freeland, both of Mich.

[73] Assignee: Dow Corning Corporation, Midland, Mich.

[21] Appl. No.: 790,906

[22] Filed: Nov. 12, 1991

[51] Int. Cl.$^5$ ............................................. C08L 75/00
[52] U.S. Cl. ...................................... 524/94; 524/102; 524/188; 524/236; 522/33; 522/41; 522/42
[58] Field of Search ................ 524/94, 102, 188, 236; 522/33, 41, 42

[56] References Cited

U.S. PATENT DOCUMENTS

| | | | |
|---|---|---|---|
| 3,986,997 | 10/1976 | Clark | 260/29.2 |
| 4,486,504 | 12/1984 | Chung | 428/412 |
| 4,554,354 | 11/1985 | Haluska | 548/110 |
| 4,822,828 | 4/1989 | Swofford | 522/84 |
| 5,013,608 | 5/1991 | Guest | 428/436 |

Primary Examiner—Maurice J. Welsh
Attorney, Agent, or Firm—Arne R. Jarnholm

[57] ABSTRACT

This invention relates to radiation curable abrasion resistant coatings for solid substrates which are tintable. The compositions of the present invention contain a quaternary ammonium salt as a tintability enhancing compound. The cured coatings of this invention simultaneously resist abrasion and provide superior tintability.

31 Claims, No Drawings

TINTABLE ABRASION RESISTANT COATING COMPOSITIONS

BACKGROUND OF THE INVENTION

This invention relates to radiation curable abrasion resistant coatings for solid substrates which are tintable. The compositions of the present invention contain a quaternary ammonium salt as a tintability enhancing compound. The cured coatings of this invention simultaneously resist abrasion and provide superior tintability.

Plastic materials have been used as substitutes for glass in many applications because of their unique properties such as weight, ease of handling, and ease of formation of articles. Most plastics, however, are soft and scratch quite readily. In order to provide abrasion resistance to plastics, silicone coatings were developed. One premier coating that has found wide acceptance for coating plastics is a thermally cured abrasion resistant coating formed from a mixture of colloidal silica and trialkoxy-functional silanes in a alcohol and water medium. Such coating material is disclosed in U.S. Pat. No. 3,986,997, issued Oct. 19, 1976, and assigned to Dow Corning Corporation, Midland, Mich.

Another Dow Corning patent, U.S. Pat. No. 4,554,354, issued Nov. 19, 1985, rendered the coating composition of U.S. Pat. No. 3,986,997 tintable by replacing the methyl group on the trialkoxy-functional silane with a longer chain organic group. The tintability of such coatings was further improved through the addition of a tintability enhancing compound selected from the group consisting of polyhydroxyl-functional compounds and butylated urea formaldehyde compounds, as disclosed in U.S. Pat. No. 5,013,608, issued May 7, 1991, and assigned to Swedlow, Inc., Garden Grove, Calif. These coatings, however, have two major drawbacks. They must be thermally cured which involves a longer cure time than radiation curing and the high temperature cure environments may damage heat sensitive materials. In addition, adhesion of these thermally cured coatings to polycarbonate type resins is very poor, without the additional step of adding a primer. Thus, it would be desirable to develop a tintable abrasion resistant coating which would adhere to polycarbonate type substrates without the use of a primer and which would be radiation curable.

The incorporation of acrylate monomers into abrasion resistant coating compositions have solved some of the above mentioned problems. Acrylate monomers attack the surface of polycarbonate type resins allowing the coating composition to adhere to the substrate without a primer and allow such compositions to be radiation cured. Acrylate monomers, however, necessitated the replacement of the alkoxy-functional silanes used in the thermally cured compositions with silanes capable of reacting with acrylates such as acryloxy, glycidoxy or and/or vinyl functional silanes. Such compositions are described, for example, in U.S. Pat. Nos. 4,822,828, issued Apr. 18, 1989 and assigned to Hoechst Celanese, Corporation, Somerville, N.J., and U.S. Pat. No. 4,486,504, issued Dec. 4, 1984 and assigned to General Electric Company, Waterford, N.Y. While the cured coating films of these compositions are curable by radiation and adhere to polycarbonate without the need of a primer, they have a major drawback. They are not tintable.

Accordingly, the need exits for a single coating composition that, when radiation cured, can accomplish the objectives of high tintability combined with significant resistance to abrasion.

SUMMARY OF THE INVENTION

It is, therefore, an object of the present invention to provide a single coating composition that can provide both resistance to abrasion and improved tintability when radiation cured.

Another object of this invention is to provide a process for making the coating composition, for coating a solid with the coating composition of the invention, and to provide a substrate coated with the coating composition of the invention.

Still another object of the present invention is to provide a method of protecting an object by placing a substrate coated with the coating composition of the present invention between a source of ultraviolet radiation and the object, and of protecting the substrate itself by coating it on at least one side with the coating composition of the invention and curing the composition.

These and other objects are accomplished herein by a coating composition which forms a transparent, tintable, abrasion resistant coating upon radiation curing, said coating composition comprising:

(A) at least one multifunctional acrylate monomer;
(B) a quaternary ammonium salt having the formula $$NR_4^+A^-$$

wherein R is independently a hydrocarbon radical having from 1 to 18 carbon atoms and A is a counterion;
(C) a dispersion of colloidal silica; and
(D) a silane selected from the group consisting of amino-organofunctional silanes, acryloxy-functional silanes, glycidoxy-functional silanes, vinyl-functional silanes and mixtures thereof.

DETAILED DESCRIPTION OF THE INVENTION

The present invention comprises a radiation curable, abrasion resistant coating composition which is tintable.

Component (A) of the present invention comprises at least one acrylate monomer which contains two or more functional groups selected from the group consisting of acryloxy and methacryloxy groups. These multifunctional acrylate monomers may be used singly or in combination with other multifunctional acrylate monomers. Some preferred multifunctional acrylate monomers useable as component (A) include: diacrylates of the formulas;
1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
polyethylene glycol diacrylate,
bisphenol A dimethacrylate,
triacrylates of the formulas;

trimethylolpropane triacrylate,
trimethylolpropane trimethacrylate,
pentaerythritol monohydroxy triacrylate,
trimethylolpropane triethoxy triacrylate,
tetraacrylates of the formulas;
pentaerythritol tetraacrylate,
di-trimethylolpropane tetraacrylate,
pentaacrylates of the formulas;
dipentaerythritol (monohydroxy) pentaacrylate.

These multifunctional acrylate monomers are commercially available from Aldrich Chemical Company, Inc., Milwaukee, Wis. Monofunctional acrylate monomers may optionally be used as reactive diluents.

The tintability enhancing compound, component (B), is a quaternary ammonium salt having the general formula $$NR_4^+ A^-$$

wherein R is independently a hydrocarbon radical having from 1 to 18 carbon atoms and A is a counterion such as a halogen, nitrate or sulfate. Preferably the counterion is bromine, chlorine or iodine. Quaternary ammonium salts which meet this formula are well known in the art and are commercially available. The only restriction on the use of a particular quaternary ammonium salt is that it be soluble in the coating composition. By "soluble" it is meant that the quaternary ammonium salt must blend uniformly with the ingredients used in a particular coating composition. Preferred quaternary ammonium salts include allyltriethylammonium bromide, trimethoxysilylpropyltriethylammonium chloride, trimethoxysilylpropylpyridinium chloride, N,N'bis(trimethoxysilylpropyl)tetramethyl-1,3-propanediammonium chloride. A process for preparing such quaternary ammonium salts is set forth below.

The tintability enhancing compound in the coating compositions of the present invention enhance the ability of the cured coating to absorb, or transmit to the substrate, dye in a tinting operation without sacrificing the abrasion resistance or adhesion properties of the unmodified coating. Rapid tinting may be achieved with the addition of a minimum of at least about 0.1 percent by weight, based on total coating solids, up to about 20 percent by weight of the tintability enhancing compound.

The third component (C) of the present invention comprises a dispersion of colloidal silica. For purposes of this invention, the term "colloidal silica" refers to stable dispersions or solutions of silica (SiO2) particles in an aqueous, aqueous-alcoholic, alcoholic or organic solvent mixture. Colloidal silica is available in acid or basic form. Either form may be utilized. It should be noted that fumed silica is excluded since fumed silica fails to disperse in the compositions of the present invention, as noted by Compositions L and M set forth below. Preferred for this invention are commercial colloidal silica dispersions having a particle size in the range of about 5 to about 100 millimicrons in diameter. More preferred are colloidal silica dispersions having a particle size of about 10 to about 30 millimicrons in diameter. Examples of colloidal silica useful in the compositions of this invention include: Nalco 1034A colloidal silica (Nalco 1034A), Nalco 84SS258 colloidal silica (Nalco 84SS258) and Nalco 1129 colloidal silica (Nalco 1129) which can be obtained from Nalco Chemical Company, Naperville, Ill.

Nalco 1034A has a mean particle size of 20 nm and an SiO2 content of approximately 34% by weight in water with a pH of approximately 3.1. Nalco 84SS258 has a mean particle size of 20 nm and an SiO2 content of approximately 30% by weight in a solution of propoxyethanol. Nalco 1129 has a mean particle size of 20 nm and an SiO2 content of approximately 30% by weight in a solution of 40% 2-Propanol (IPA) and 30% water. Colloidal silica, when used, is preferably present in an amount of from 1 to 70 weight percent based on solids. More preferably, the colloidal silica, component (C), is present in an amount of from 30 to 55 weight percent based on solids.

The fourth component (D) comprises a silane selected from the group consisting of amino-organofunctional silanes, acryloxy-functional silanes, glycidoxy-functional silanes, vinyl-functional silanes and any combination of the silanes. The amino-organofunctional silane, or mixtures thereof, is selected from the group consisting of $$X_a SiQNZH_{4-u}$$

and $$X_a Si(Q(NHQ')_v NZH_{4-u};$$

wherein:
X is selected from alkoxy groups having 1-6 carbon atoms;
Q and Q' are the same or different divalent hydrocarbon groups;
Z is a hydrogen or a monovalent hydrocarbon group;
u is an integer from 1 to 3; and
v is an integer from 1 to 6.
Preferred for this invention are monoamines and diamines, that is amines wherein v is 0 or 1. Specific examples of the most preferred amino-organofunctional silanes are:
N-(2-aminoethyl-3-aminopropyl)trimethoxysilane
3-aminopropyltriethoxysilane
3-aminopropyltrimethoxysilane
anilinopropyltrimethoxysilane.
These amino-organofunctional silanes are commercially available from Petrarch Systems, Inc., Bristol, Pa.

Component (D) may also be an acryloxy-functional silane instead of an amino-organofunctional silane, or it may be a mixture of both types of silanes. The acryloxy-functional silane, or mixtures thereof, is selected from the group consisting of $$(R^3O)_b-Si-(R^5-O-\overset{O}{\overset{\|}{C}}-\overset{R^6}{\overset{|}{C}}=CH_2)_d \text{ and}$$

$$(R^3O)_b R_c^4-Si-(R^5-O-\overset{O}{\overset{\|}{C}}-\overset{R^6}{\overset{|}{C}}=CH_2)_h;$$

R3 and R4 are the same or different monovalent hydrocarbon radicals;
R5 is a divalent hydrocarbon radical having from 2 to 8 carbon atoms; R6 is hydrogen or a monovalent hydrocarbon radical;
b is an integer from 1 to 3; c is an integer from 1 to 2;
d is an integer equaling 4-b;
h is an integer equaling 4-b-c.
Preferably, R3 and R4 will be lower alkyl radicals such as methyl, ethyl, propyl, etc., but they may also be other saturated and unsaturated species including vinyl, aryl, etc. In many of the embodiments of the present invention, b will ordinarily be 3, and d will equal 1. Specific examples of the most preferred acryloxy-functional silanes are:

3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane
3-acryloxypropyltriethoxysilane
2-methacryloxyethyltriethoxysilane
2-acryloxyethyltriethoxysilane.

These acryloxy-functional silanes are commercially available from Petrarch Systems, Inc., Bristol, Pa.

Component (D) may also be a glycidoxy-functional silane instead of an amino-organofunctional silane or acryloxy-functional silane, or it may be a mixture of these silanes. A glycidoxy-functional silane, or mixtures thereof, is selected from the group consisting of

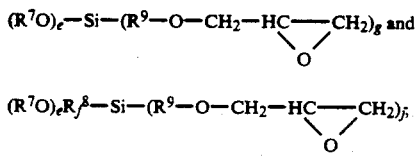

wherein:
$R^7$ and $R^8$ are the same or different monovalent hydrocarbon radicals;
$R^9$ is a divalent hydrocarbon radical having from 2 to 8 carbon atoms;
e is an integer from 1 to 3;
f is an integer from 1 to 2;
g is an integer equaling 4-e;
j is an integer equaling 4-e-f.

Specific examples of the most preferred glycidoxy-functional silanes are:

3-glycidoxypropyltrimethoxysilane
2-glycidoxyethyltrimethoxysilane
3-glycidoxypropyltriethoxysilane
2-glycidoxyethyltriethoxysilane.

These glycidoxy-functional silanes are commercially available from Petrarch Systems, Inc., Bristol, Pa.

Component (D) may also be a vinyl-functional silane instead of an amino-organofunctional silane, acryloxy-functional silane, glycidoxy-functional silane or it may be a mixture of these silanes. A vinyl-functional silane, or mixtures thereof, conforms to the formula

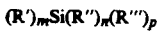

wherein:
R' is an allyl or vinyl-functional alkyl;
R" is hydrolyzable alkoxy or phenoxy;
R'" is a non-hydrolyzable, saturated alkyl, phenyl, or siloxy such that m+n+p=4, and m≧1; n≧1; and p≧0.

By "hydrolyzable alkoxy or phenoxy" it is meant any alkoxy or phenoxy substituent which will be readily hydrolyzed when the vinyl-functional silane is added to the colloidal silica as described below and which will not impart undesirable haze to the cured abrasion resistant layer. Lower alkoxy groups, such as methoxy, ethoxy, and propyloxy, come within this definition, with methoxy being preferred. Specific examples of the most preferred vinyl-functional silanes are:

vinyltriethoxysilane
vinyltrimethoxysilane
vinyltris(2-methoxyethoxy)silane.

These vinyl-functional silanes are commercially available from Petrarch Systems, Inc., Bristol, Pa.

Other additives can be added to the compositions in order to enhance the usefulness of the coatings. For example, leveling agents, ultraviolet light absorbers, hindered amine light stabilizers (HALS), dyes and the like, can be included herein. All of these additives and the use thereof are well known in the art and do not require extensive discussions. Therefore, only a limited number will be referred to, it being understood that any of these compounds can be used so long as they do not deleteriously effect the radiation curing of the coating composition and do not adversely effect the tintability of the coating.

A particularly desirable additive has been found to be a small amount of a leveling agent. Leveling agents can be used on the substrates to cover surface irregularities and aid in the uniform dispersion of the coating composition. These agents are especially useful in compositions where all the solvent has been removed. For purposes of the present invention, the addition of 0.01 to 5.0 percent commercial silicone glycol leveling agents, work well to provide the coating composition with desirable flowout and wetting properties.

Also useful as additives to the present coating compositions are UV absorbers. UV absorbers act to diminish the harmful effects of UV radiation on the final cured product and thereby enhance the weatherability, or resistance to cracking, yellowing and delamination of the coating. Incorporating UV absorbers into the instant compositions will permit the curing process regardless of whether UV or electron beam radiation is used to cure the composition. However, in the situation where UV radiation is to be used to cure the composition, the amount of UV absorbers added must be carefully controlled so as not to hinder the cure. This limitation does not exist in the case of electron beam radiation cure.

For the purpose of the present compositions the following UV absorbers and combinations thereof in concentrations of less than 20 weight percent based on the total composition, have been shown to produce desirable results: bis(1,2,2,6,6-pentamethyl-4-piperidinyl)(3,5-bis(1,1-dimethylethyl 1-4-hydroxyphenyl)methyl)butylpropanedioate, 2-ethylhexyl-2-cyano-3,3'-diphenylacrylate, 2-hydroxyl-4-n-octoxybenzophenone, 2-(2'-hydroxy-5'-methylphenyl)benzotriazole and poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy. Concentrations of UV absorbers, however, in the range of 1 to 5 percent based on the total weight of the composition are preferred.

In the practice of the present invention, the radiation curable compositions can be made by combining the multifunctional acrylate monomer with a given quantity of alcohol. Suitable alcohols, for example, include any water soluble or water miscible alcohol, for example, methanol, ethanol, propanol, butanol, etc., or ether alcohols, such as ethoxyethanol, butoxyethanol, methoxypropanol, etc. For purposes of the present invention, applicants prefer to use isopropanol.

Generally, the manner in which these components are mixed together is not important. If a silane is added, the silane is added dropwise to the mixture while agitation is applied. In addition, a small amount of organic acid may optionally be added dropwise to the mixture at this time. Suitable organic acids include, for example, acrylic acid, acetic acid and benzoic acid, etc. The colloidal silica, component (C), is then added while agitation is applied to the mixture. In the case where a solventless coating is to be prepared, the solvent is substantially removed under reduced pressure. The quaternary ammonium salt is added and the composition is applied to a substrate.

The above described compositions are coated on a substrate using conventional coating techniques modified as appropriate to the particular substrate. For example, these compositions can be applied to a variety of solid substrates by methods such as roller coating, flow coating, dip coating, spraying, brushing, spin coating, spray coating, curtain coating and cascading. Dip coating and other coating techniques that coat both sides of a substrate may also be used, or single side coating techniques may be repeated on the other side of a substrate if desired. These various methods of coating allow the compositions to be placed on at least one side of the substrate at variable thicknesses, thus allowing a wider range of uses of the coating. Ordinarily, the coating composition of this invention performs best when the cured coating is in the range of about 1 to about 10 microns thick. Thicknesses in this range allow for optimum tinting in shorter times without impairing the optical clarity of the coated substrates such as by, e.g., cracking.

The compositions may be ultraviolet light cured if one or more photoinitiators is added prior to curing. Oxygen inhibitors, which are materials used in conjunction with photoinitiators that increase their efficiency, may also be added. Examples of a preferred oxygen inhibitors are 2-ethylhexyl-para-dimethylaminobenzoate, available as Uvatone ® 8303, from The UpJohn Company, North Haven, Conn., and methyldiethanolamine, available from Aldrich Chemical Company, Milwaukee, Wis.

There are no special restrictions on the radical-type photoinitiators as long as they can generate radicals by the absorption of optical energy. Ultraviolet light sensitive photoinitiators or blends of initiators which may be used in the UV cure of the present composition include 2-Hydroxy-2-methyl-1-phenyl-propan-1-one (Darocur ® 1173), sold by EM Industries, Inc., Hawthorne, N.Y., and 2,2-Dimethoxy-2-phenyl-acetyl-phenone (Irgacure ® 651), sold by Ciba-Geigy Corporation, Hawthorne, N.Y. In addition, cationic-type photoinitiators such as Cyracure ® UVI 6974 or UVI 6990, sold by Union Carbide Corporation, Danbury, Conn., may also be used in conjunction with the radical-type photoinitiators. For purposes of this invention, it has been found that from 0.05 to 5 weight percent based on the total solids in the composition, of the photoinitiators described herein will cause the composition to cure.

Desirable hard, tintable coatings having excellent adhesion can thus be obtained when the composition of this invention is applied to a substrate and exposed to radiation such as that provided by UV lamps. When the aforementioned photoinitiators and oxygen inhibitors are used, these additives are individually mixed with either the aforementioned mixtures before the solvents have been removed or to the residue remaining after the removal of solvents.

Alternatively, the coating composition may be electron beam radiation cured and no photoinitiator is required. Electron beam sources of various types such as van de Graaff-type, resonance transformer-type, lineartype, dynatron-type, and high frequency-type can be used as a source of electron beam. Electron beam having energy of from 50 to 1000 KeV, preferably from 100 to 300 KeV discharged therefrom may be irradiated in a dose of from 0.1 to 10.0 Mega Rads (MR). A particularly preferred source of electron beam is one wherein a continuous curtain-like beam is irradiated from linear filaments. Examples of commercially available sources of electron beam are Electro Curtain CB-150 available from Energy Sciences Inc., and NP-ESH 150 available from Otto Durr.

The curable composition obtained in the process of the present invention is coated on the surface of a substrate (e.g., polycarbonate, etc.). After said composition has been ultraviolet light or electron beam treated, a cured coating film is formed.

By choice of the proper formulation and application conditions including the optional use of a leveling agent, the compositions can be applied and will adhere to substantially all solid substrates. Substrates which are especially contemplated herein are transparent and non-transparent plastics and glass. The compositions of this invention are especially useful as transparent coatings for polycarbonates such as poly(bisphenol-A carbonate) and those polycarbonates known as Lexan( ®), sold by General Electric Company, Schenectady, N.Y.; and as coatings for acrylics such as polymethylmethacrylates. Other solid substrates contemplated herein include glass, metal, wood, painted surfaces, leather, ceramic, textiles and paper.

The apparatus and testing procedures used for the results shown herein are as follows:

Preparation of the Quaternary Ammonium Salts:

1. Allyltriethylammonium Bromide

A mixture of 60 grams of methanol, 60.23 grams of triethylamine and 60.72 grams of allyl bromide was prepared. The mixture was stirred for 5 minutes before refluxing. The mixture was allowed to reflux for 30 minutes before 12.0 grams of allyl bromide was added.

2. Trimethoxysilylpropyltriethylammonium Chloride

A mixture of 60.0 grams of methanol, 60.0 grams of chloropropyltrimethoxysilane and 19.53 grams of triethylamine was prepared. The mixture was heated and allowed to reflux for 96 hours. A pinkish tint was observed. The mixture was vacuum stripped at 80° C. and 29 inches of Hg, for one hour. The mixture became brown in color. Upon cooling, solidified to form a crystal salt. To 8.0 grams of the product was added 2.0 grams of isopropanol wherein the salt dissolved.

3. Trimethoxysilylpropylpyridinium Chloride

A mixture of 60.0 grams of methanol, 60.0 grams of chloropropyltrimethoxysilane and 15.26 grams of pyridine was prepared. The mixture was heated and allowed to reflux for 72 hours. The mixture was vacuum stripped at 80° C. and 29 inches of Hg, for one hour. Following hexane and isopropanol washes, a white salt formed. The salt was dissolved in 15 grams of isopropanol.

4. N,N'bis(trimethoxysilylpropyl)tetramethyl-1,3-propanediammonium Chloride

A mixture of 60.0 grams of methanol, 60.0 grams of chloropropyltrimethoxysilane and 10.48 grams of tetramethyl-1,3-propanediamine was prepared. The mixture was heated and allowed to reflux for 96 hours. Upon cooling to room temperature, the mixture solidified forming a product. The product was dissolved in isopropanol.

5. 3-(trimethoxysilyl)-propyloctadecyldimethylammonium Chloride

DC 5700 Antimicrobial is a 42 weight percent solution of 3-(trimethoxysilyl)-propyloctadecyldimethylammonium chloride in methanol which has the following formula:

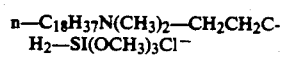

DC 5700 Antimicrobial is available from Dow Corning Corporation, Midland, Mich.

Preparation of the Coating Compositions:

A. A mixture of 1.08 grams of 3-aminopropyltrimethoxysilane, 51.46 grams of isopropanol, 1.36 grams of hexanedioldiacrylate and 3.79 grams of trimethylolpropanetriacrylate was prepared. The mixture was allowed to stand at room temperature for seventy two hours. Nalco 1034A colloidal silica, 11.24 grams, was added and the mixture was shaken. To this mixture was added 0.10 g of 2-Hydroxy-2-methyl-1-phenyl-propan-1-one and 0.05 g of 2-ethylhexyl-para-dimethylaminobenzoate.

B. A mixture of 1.08 grams of 3-aminopropyltrimethoxysilane, 51.46 grams of isopropanol, 1.36 grams of hexanedioldiacrylate and 3.79 grams of trimethylolpropanetriacrylate was prepared. The mixture was allowed to stand at room temperature for seventy two hours. Nalco 1034A colloidal silica, 11.24 grams, was added and the mixture was shaken. The mixture was allowed to stand for 18 hours before being vacuum stripped at 35° C. and 29 inches of Hg, until all volatiles were removed. To this mixture was added 0.10 g of 2-Hydroxy-2-methyl-1-phenyl-propan-1-one and 0.05 g of 2-ethylhexyl-para-dimethylaminobenzoate.

C. A mixture of 2.07 grams of 2-hydroxyethylacrylate, 51.46 grams of isopropanol, and 4.16 grams of trimethylolpropanetriacrylate was prepared. The mixture was shaken. Nalco 1034A colloidal silica, 11.24 grams, was added and the mixture was shaken. The mixture was then allowed to stand for 18 hours, before being vacuum stripped at 35° C. and 29 inches of Hg, until all volatiles were removed. To this mixture was added 0.10 g of 2-Hydroxy-2-methyl-1-phenyl-propan-1-one and 0.05 g of 2-ethylhexyl-para-dimethylaminobenzoate.

D. A mixture of 51.46 grams of isopropanol, 1.36 grams of hexanedioldiacrylate, and 3.79 grams of trimethylolpropanetriacrylate was prepared. The mixture was shaken. Nalco 1034A colloidal silica, 11.24 grams, was added and the mixture was shaken. The mixture was then allowed to stand for 18 hours, before being vacuum stripped at 35° C. and 29 inches of Hg, until all volatiles were removed. To this mixture was added 0.10 g of 2-Hydroxy-2-methyl-1-phenyl-propan-1-one and 0.05 g of 2-ethylhexyl-para-dimethylaminobenzoate.

E. A mixture of 51.46 grams of isopropanol, 1.49 grams of 3-methacryloxypropyl trimethoxysilane, and 4.47 grams of trimethylolpropanetriacrylate was prepared. The mixture was shaken. Nalco 1034A colloidal silica, 11.24 grams, was added and the mixture was shaken. The mixture was allowed to stand for 18 hours, before being vacuum stripped at 35° C. and 29 inches of Hg, until all volatiles were removed. To this mixture was added 0.10 g of 2-Hydroxy-2-methyl-1-phenyl-propan-1-one and 0.05 g of 2-ethylhexyl-para-dimethylaminobenzoate.

F. SILVUE 313 is a commercially available coating composition from SDC Coatings, Inc. Garden Grove, Calif. SILVUE 313 is a silica filled siloxane coating based on methyltrimethoxysilane and gamma-glycidoxypropyltrimethoxysilane with 2% acetic acid, 30% isopropanol, 13% butanol and 19% methanol.

G. A mixture of 51.46 grams of isopropanol, 1.36 grams of hexanedioldiacrylate, and 3.79 grams of trimethylolpropanetriacrylate was prepared. The mixture was shaken. To this mixture was added 0.10 g of 2-Hydroxy-2-methyl-1-phenyl-propan-1-one and 0.05 g of 2-ethylhexyl-para-dimethylaminobenzoate.

H. A mixture of 2.07 grams of 2-hydroxyethylacrylate, 51.46 grams of isopropanol, and 4.16 grams of trimethylolpropanetriacrylate was prepared. The mixture was shaken. Nalco 1034A colloidal silica, 11.24 grams, was added and the mixture was shaken. To this mixture was added 0.14 g of 2-Hydroxy-2-methyl-1-phenyl-propan-1-one and 0.07 g of 2-ethylhexyl-para-dimethylaminobenzoate.

I. A mixture of 51.46 grams of isopropanol, 1.36 grams of hexanedioldiacrylate, and 3.79 grams of trimethylolpropanetriacrylate was prepared. The mixture was shaken. Nalco 1034A colloidal silica, 11.24 grams, was added and the mixture was shaken. To this mixture was added 0.13 g of 2-Hydroxy-2-methyl-1-phenyl-propan-1-one and 0.07 g of 2-ethylhexyl-para-dimethylaminobenzoate.

J. A mixture of 1.08 grams of 3-aminopropyltrimethoxysilane, 51.46 grams of isopropanol, 1.36 grams of hexanedioldiacrylate and 3.79 grams of trimethylolpropanetriacrylate was prepared. To this mixture was added 0.11 g of 2-Hydroxy-2-methyl-1-phenyl-propan-1-one and 0.06 g of 2-ethylhexyl-para-dimethylaminobenzoate.

K. A mixture of 2.07 grams of 2-hydroxyethylacrylate, 51.46 grams of isopropanol, and 4.16 grams of trimethylolpropanetriacrylate was prepared. To this mixture was added 0.11 g of 2-Hydroxy-2-methyl-1-phenyl-propan-1-one and 0.06 g of 2-ethylhexyl-para-dimethylaminobenzoate.

L. A mixture of 1.08 grams of 3-aminopropyltrimethoxysilane, 58.88 grams of isopropanol, 1.36 grams of hexanedioldiacrylate and 3.79 grams of trimethylolpropanetriacrylate was prepared. The mixture was allowed to stand at room temperature for seventy two hours. Cabot CAB-O-SIL® S-17 fumed silica, 3.82 grams, was added and the mixture was stirred vigorously. A milky white mixture resulted. Repeated attempts at passing the mixture through a colloidal mill failed to disperse the fumed silica.

M. A mixture of 1.08 grams of 3-aminopropyltrimethoxysilane, 58.88 grams of isopropanol, 1.36 grams of hexanedioldiacrylate and 3.79 grams of trimethylolpropanetriacrylate was prepared. The mixture was allowed to stand at room temperature for seventy two hours. Cabot CAB-O-SIL® MS-75 fumed silica, 3.82 grams, was added and the mixture was stirred vigorously. A milky white mixture resulted. Repeated attempts at passing the mixture through a colloidal mill failed to disperse the fumed silica.

Tabor Abrasion Resistance Test

Abrasion resistance was determined according to ASTM No. D-1044. The instrument used was a Teledyne Taber model 503 Taber Abraser with two 250 gram auxiliary weights (500 gram load) for each of the CS10F abrasive wheels. The acrylic and polycarbonate test panels were subjected to 100 and 500 cycles on the abraser turntable. The percent change in haze which is the criterion for determining the abrasion resistance of the coating is determined by measuring the difference in haze of the unabrased and abrased coatings. Haze is defined as the percentage of transmitted light which, in passing through the sample, deviates from the incident beam by forward scattering. In this method, only light flux that deviates more than 2.5 degrees on the average is considered to be haze. The percent haze on the coatings was determined by ASTM D-1003. A Gardner Haze Meter was used. The haze was calculated by measuring the amount of diffused light, dividing by the amount of transmitted light and multiplying by one hundred.

Adhesion Test

The adhesion of the cured coating to the substrate was measured using the crosshatch adhesion test, ASTM No. D-3359. This involves scribing a criss-cross pattern (grid) on the coated surface, applying a 3M 600 tape, and pulling it away sharply in one quick motion at about a 90° angle. This action of applying and removing the tape is carried out three times and then the substrate is observed. The number of squares remaining intact on the substrate are reported as a percentage of the total number of squares on the grid.

Steel Wool Test

A two inch square of 0000 steel wool was applied over the face of a 24 oz. hammer and was secured with a rubber band. Coated sample blanks were tested for scratch resistance to 20 double rubs across the center of the sample with the weighted steel wool. The hammer is held by the end of its handle such that the majority of the pressure on the steel wool comes from the hammer head. The sample is graded according to the amount of scratching produced by the steel wool and hammer. The absence of scratches on the sample is graded a 1; slight scratching is graded a 2 and heavy scratching is graded a 3.

Pencil Test

This test is meant to be a qualitative method of determining scratch resistance of a coating. A coated panel is placed on a firm horizontal surface. A pencil is held firmly against the film at a 45° angle (point away from the operator) and pushed away from the operator in a ¼-in. (6.5-mm) stroke. The process is started with the hardest lead pencil and continued down the scale of hardness to the pencil that will not cut into or gouge the film. The hardest pencil that will not cut through the film to the substrate for a distance of at least ⅛ in. (3 mm) is reported according to the following scale from Berol Corporation, Brentwood, Tenn.:

---softer---   ---harder---

6B, 5B, 4B, 3B, 2B, B, HB, F, H, 2H, 3H, 4H, 5H, 6H, 7H, 8H, 9H. The HB grade is approximately equal to that of a #2 pencil. The F grade is slightly harder and is the one most commonly used. The H grades are harder than that and get progressively harder up through the 9H grade which is very hard. The B grade is softer that the HB grade and get progressively softer through the 6B grade which is very soft.

Tinting Test

The polycarbonate panels were tinted using commercially available dyes from Brain Power, Inc., Miami, Fla., namely BPI Black dyes. The tinting was carried out by immersing the panels into a dye bath for 45 minutes. The dye bath consisted of 100 milliliters of BPI Black Dye and 900 milliliters of deionized water, heated to 95° C. The degree of tint obtained as shown by the percent of light transmission through the lens was measured using a Gardner XL-835 colorimeter manufactured by Gardner Laboratory, Inc., Bethesda, Md., and is reported as percent transmission.

The lower the percent of light transmitted, the greater is the amount of dye absorbed or transmitted to the lens by the coating.

In order that those skilled in the art may better understand how to practice the present invention, the following examples are given by way of illustration and not by way of limitation. All parts and percentages in the examples are on a weight basis unless otherwise indicated.

EXAMPLE I

An uncoated polycarbonate panel was placed in the dye bath. The test results are summarized in Table II.

EXAMPLE II

Coating Composition A was coated onto a 4×4×1/16 inch polycarbonate panel using a #7 mayer rod. The coated polycarbonate panel was UV cured by passing the panel under a medium pressure mercury vapor arc lamp with an average intensity of 91.56 mW/cm² at a line speed of six feet per minute. The test results are summarized in Tables I and II.

EXAMPLE III

Coating Composition B was coated and cured as in Example II. The test results are summarized in Tables I and II.

EXAMPLE IV

Coating Composition C was coated and cured as in Example II. The test results are summarized in Tables I and II.

EXAMPLE V

Coating Composition D was coated and cured as in Example II. The test results are summarized in Tables I and II.

EXAMPLE VI

Coating Composition E was coated and cured as in Example II. The test results are summarized in Tables I and II.

EXAMPLE VII

To 9.5 grams of Coating Composition B was added 0.5 grams of bromide quaternary ammonium salt, described above. The coating composition was coated and cured as in Example II. The test results are summarized in Tables I and II.

EXAMPLE VIII

To 9.5 grams of Coating Composition C was added 0.5 grams of bromide quaternary ammonium salt, described above. The colloidal silica immediately precipitated.

EXAMPLE IX

To 9.5 grams of Coating Composition D was added 0.5 grams of bromide quaternary ammonium salt, described above. The colloidal silica immediately precipitated.

EXAMPLE X

To 9.5 grams of Coating Composition E was added 0.5 grams of bromide quaternary ammonium salt, described above. The colloidal silica immediately precipitated.

EXAMPLE XI

To 9.5 grams of Coating Composition B was added 0.48 grams of triethylamine quaternary ammonium salt, described above. The coating composition was coated and cured as in Example II. The test results are summarized in Tables I and II.

EXAMPLE XII

To 9.5 grams of Coating Composition C was added 0.48 grams of triethylamine quaternary ammonium salt, described above. The colloidal silica immediately precipitated.

EXAMPLE XIII

To 9.5 grams of Coating Composition D was added 0.48 grams of triethylamine quaternary ammonium salt, described above. The colloidal silica immediately precipitated.

EXAMPLE XIV

To 9.5 grams of Coating Composition E was added 0.48 grams of triethylamine quaternary ammonium salt, described above. The colloidal silica immediately precipitated.

EXAMPLE XV

To 9.0 grams of Coating Composition B was added 1.0 gram of 3-(trimethoxysilyl)-propyloctadecyldimethyl ammonium chloride, described above. The coating composition was coated and cured as in Example II. The test results are summarized in Tables I and II.

EXAMPLE XVI

To 9.0 grams of Coating Composition C was added 1.0 gram of 3-(trimethoxysilyl)-propyloctadecyldimethyl ammonium chloride, described above. The colloidal silica immediately precipitated.

EXAMPLE XVII

To 9.5 grams of Coating Composition D was added 0.85 grams of 3-(trimethoxysilyl)-propyloctadecyldimethyl ammonium chloride, described above. The colloidal silica immediately precipitated.

EXAMPLE XVIII

To 9.0 grams of Coating Composition E was added 0.85 grams of 3-(trimethoxysilyl)-propyloctadecyldimethyl ammonium chloride, described above. The colloidal silica immediately precipitated.

EXAMPLE XIX

To 9.5 grams of Coating Composition B was added 0.54 grams of pyridine quaternary ammonium salt, described above. The coating composition was coated and cured as in Example II. The test results are summarized in Tables I and II.

EXAMPLE XX

To 9.5 grams of Coating Composition C was added 0.54 grams of pyridine quaternary ammonium salt, described above. The colloidal silica immediately precipitated.

EXAMPLE XXI

To 9.5 grams of Coating Composition D was added 0.54 grams of pyridine quaternary ammonium salt, described above. The colloidal silica immediately precipitated.

EXAMPLE XXII

To 9.0 grams of Coating Composition E was added 0.54 grams of pyridine quaternary ammonium salt, described above.

EXAMPLE XXIII

To 9.5 grams of Coating Composition B was added 0.54 grams of diamine quaternary ammonium salt, described above. The coating composition was coated and cured as in Example II. The test results are summarized in Tables I and II.

EXAMPLE XXIV

To 9.5 grams of Coating Composition C was added 0.54 grams of diamine quaternary ammonium salt, described above. The colloidal silica immediately precipitated.

EXAMPLE XXV

To 9.5 grams of Coating Composition D was added 0.54 grams of diamine quaternary ammonium salt, described above. The colloidal silica immediately precipitated.

EXAMPLE XXVI

To 9.0 grams of Coating Composition E was added 0.54 grams of diamine quaternary ammonium salt, described above. The colloidal silica immediately precipitated.

EXAMPLE XXVII

To 9.0 grams of Coating Composition B was added 0.25 grams of 3-(trimethoxysilyl)-propyloctadecyldimethyl ammonium chloride, described above. The coating composition was coated and cured as in Example II. The test results are summarized in Tables I and II.

EXAMPLE XXVIII

To 9.0 grams of Coating Composition B was added 0.5 grams of 3-(trimethoxysilyl)-propyloctadecyldimethyl ammonium chloride, described above. The coating composition was coated and cured as in Example II. The test results are summarized in Tables I and II.

EXAMPLE XXIX

To 9.0 grams of Coating Composition B was added 0.75 grams of 3-(trimethoxysilyl)-propyloctadecyldimethyl ammonium chloride, described above. The coating composition was coated and cured as in Example II. The test results are summarized in Tables I and II.

EXAMPLE XXX

To 9.5 grams of Coating Composition B was added 0.07 grams of bromide quaternary ammonium salt, described above. The coating composition was coated and cured as in Example II. The test results are summarized in Tables I and II.

EXAMPLE XXXI

To 9.5 grams of Coating Composition B was added 0.35 grams of bromide quaternary ammonium salt, described above. The coating composition was coated and cured as in Example II. The test results are summarized in Tables I and II.

EXAMPLE XXXII

To 9.5 grams of Coating Composition B was added 0.70 grams of bromide quaternary ammonium salt, described above. The coating composition was coated and cured as in Example II. The test results are summarized in Tables I and II.

EXAMPLE XXXIII

To 9.5 grams of Coating Composition B was added 1.40 grams of bromide quaternary ammonium salt, described above. The coating composition was coated and cured as in Example II. The test results are summarized in Tables I and II.

EXAMPLE XXXIV

An uncoated acrylic panel was placed in the dye bath. The test results are summarized in Table II.

EXAMPLE XXXV

An acrylic panel was coated with Composition F. The test results are summarized in Tables I and II.

EXAMPLE XXXVI

To 10.0 grams of Coating Composition F was added 0.19 grams of 3-(trimethoxysilyl)-propyloctadecyldimethyl ammonium chloride, described above. The coating composition was coated and cured as in Example II. The test results are summarized in Tables I and II.

EXAMPLE XXXVII

To 10.0 grams of Coating Composition F was added 0.10 grams of triethylamine quaternary salt, described above. The coating composition was coated and cured as in Example II. The test results are summarized in Tables I and II.

EXAMPLE XXXVIII

Coating Composition A was coated and cured as in Example II. The test results are summarized in Tables I and II.

EXAMPLE XXXIXL

Coating Composition H was coated and cured as in Example II. The test results are summarized in Tables I and II.

EXAMPLE XL

Coating Composition I was coated and cured as in Example II. The test results are summarized in Tables I and II.

EXAMPLE XLI

To Coating Composition H was added 0.58 grams of bromide quaternary ammonium salt, described above. The coating composition was coated and cured as in Example II. The test results are summarized in Tables I and II.

EXAMPLE XLII

To Coating Composition H was added 0.55 grams of pyridine quaternary ammonium salt, described above. The mixture was coated and cured as in Example II. The test results are summarized in Tables I and II.

EXAMPLE XLIII

To Coating Composition I was added 0.53 grams of bromide quaternary ammonium salt, described above. The mixture was coated and cured as in Example II. The test results are summarized in Tables I and II.

EXAMPLE XLIV

To Coating Composition I was added 0.50 grams of pyridine quaternary ammonium salt bromide, described above. The mixture was coated and cured as in Example II. The test results are summarized in Tables I and II.

EXAMPLE XLV

Coating Composition J was coated and cured as in Example II. The test results are summarized in Tables I and II.

EXAMPLE XLVI

Coating Composition K was coated and cured as in Example II. The test results are summarized in Tables I and II.

EXAMPLE XLVII

Coating Composition G was coated and cured as in Example II. The test results are summarized in Tables I and II.

EXAMPLE XLVIII

To Coating Composition J was added 0.38 grams of bromide quaternary ammonium salt, described above. The mixture was coated and cured as in Example II. The test results are summarized in Tables I and II.

EXAMPLE IL

To Coating Composition J was added 0.36 grams of pyridine quaternary ammonium salt, described above. The mixture was coated and cured as in Example II. The test results are summarized in Tables I and II.

EXAMPLE L

To Coating Composition K was added 0.38 grams of bromide quaternary ammonium salt, described above. The mixture was coated and cured as in Example II. The test results are summarized in Tables I and II.

EXAMPLE LI

To Coating Composition K was added 0.36 grams of pyridine quaternary ammonium salt, described above. The mixture was coated and cured as in Example II. The test results are summarized in Tables I and II.

EXAMPLE LII

To Coating Composition G was added 0.37 grams of bromide quaternary ammonium salt, described above. The mixture was coated and cured as in Example II. The test results are summarized in Tables I and II.

EXAMPLE LIII

To Coating Composition G was added 0.36 grams of pyridine quaternary ammonium salt, described above. The mixture was coated and cured as in Example II. The test results are summarized in Tables I and II.

TABLE I

Abrasion Resistant Properties of Coated Polycarbonate Coating Compositions

| | ADHESION TEST | STEEL WOOL | PENCIL TEST | ABRASION TEST % H100/% H500 | |
|---|---|---|---|---|---|
| Ex. II | 100% | 1 | HB | 1.9 | 6.8 |
| Ex. III | 100% | 1 | HB | 1.7 | 7.7 |
| Ex. IV | 100% | 2 | HB | 2.4 | 7.6 |
| Ex. V | 100% | 2 | HB | 2.6 | 8.1 |
| Ex. VI | 100% | 2 | HB | 2.7 | 6.5 |
| Ex. VII | 100% | 1 | HB | 2.4 | 8.1 |
| Ex. XI | 100% | 1 | HB | 2.4 | 9.8 |
| Ex. XV | 100% | 2 | HB | 3.6 | 16.2 |
| Ex. XIX | 100% | 2 | HB | 1.8 | 6.9 |
| Ex. XXIII | 100% | 1 | HB | 1.8 | 7.3 |
| Ex. XXVII | 100% | 1 | HB | 2.1 | 7.6 |
| Ex. XXVIII | 100% | 1 | HB | 2.9 | 8.6 |
| Ex. XXIX | 100% | 2 | HB | 2.6 | 9.7 |
| Ex. XXX | 100% | 2 | HB | 1.5 | 7.0 |
| Ex. XXXI | 100% | 2 | HB | 2.0 | 6.8 |
| Ex. XXXII | 100% | 2 | HB | 2.4 | 7.7 |
| Ex. XXXIII | 100% | 2 | HB | −1.5 | 3.8 |
| Ex. XXXV | 100% | 1 | HB | 1.8 | 6.3 |
| Ex. XXXVI | 100% | 1 | HB | 1.8 | 7.4 |
| Ex. XXXVII | 100% | 1 | HB | 2.0 | 8.0 |
| Ex. XXXVIII | 100% | 1 | HB | 1.9 | 6.8 |
| Ex. IXL | 100% | 2 | HB | 2.9 | 8.6 |
| Ex. XL | 100% | 2 | HB | 3.2 | 10.5 |
| Ex. XLI | 100% | 2 | HB | 3.6 | 8.7 |
| Ex. XLII | 100% | 2 | HB | 4.3 | 8.7 |
| Ex. XLIII | 100% | 2 | HB | 3.4 | 10.4 |
| Ex. XLIV | 100% | 2 | HB | 3.1 | 10.6 |
| Ex. XLV | 100% | 2 | HB | 33.9 | 44.2 |
| Ex. XLVI | 100% | 2 | HB | 9.3 | 12.5 |
| Ex. XLVII | 100% | 2 | HB | 4.4 | 15.9 |
| Ex. XLVIII | 100% | 2 | HB | 30.0 | 44.1 |
| Ex. IL | 100% | 2 | HB | 31.2 | 41.8 |
| Ex. L | 100% | 2 | HB | 12.1 | 15.5 |
| Ex. LI | 100% | 2 | HB | 10.3 | 17.4 |
| Ex. LII | 100% | 2 | HB | 8.3 | 15.7 |
| Ex. LIII | 100% | 2 | HB | 8.0 | 16.3 |

TABLE II

Tintability Properties of Coated Polycarbonate Coating Compositions

| | Before Tinting L.T. (percent) | After Tinting L.T. (percent) |
|---|---|---|
| Ex. I | 89 | 2.3 |
| Ex. II | 89 | 61.4 |
| Ex. III | 89 | 64.3 |
| Ex. IV | 89 | 64.8 |
| Ex. V | 89 | 52.8 |
| Ex. VI | 89 | 71.0 |
| Ex. VII | 89 | 27.4 |
| Ex. XI | 89 | 41.4 |
| Ex. XV | 89 | 47.2 |
| Ex. XIX | 89 | 61.4 |
| Ex. XXIII | 89 | 65.3 |
| Ex. XXVII | 89 | 62.5 |
| Ex. XXVIII | 89 | 45.9 |
| Ex. XXIX | 89 | 47.1 |
| Ex. XXX | 89 | 61.9 |
| Ex. XXXI | 89 | 51.3 |
| Ex. XXXII | 89 | 24.8 |
| Ex. XXXIII | 89 | 14.0 |
| Ex. XXXIV | 91 | 48.0 |
| Ex. XXXV | 91 | 90.8 |
| Ex. XXXVI | 91 | 91.3 |
| Ex. XXXVII | 91 | 91.1 |
| Ex. XXXVIII | 89 | 61.4 |
| Ex. IXL | 89 | 58.0 |
| Ex. XL | 89 | 49.0 |
| Ex. XLI | 89 | 44.0 |
| Ex. XLII | 89 | 47.0 |
| Ex. XLIII | 89 | 27.0 |
| Ex. XLIV | 89 | 30.0 |
| Ex. XLV | 91 | 16.0 |
| Ex. XLVI | 91 | 57.0 |
| Ex. XLVII | 91 | 41.0 |
| Ex. XLVIII | 91 | 9.0 |
| Ex. IL | 91 | 10.0 |
| Ex. L | 91 | 46.0 |
| Ex. LI | 91 | 47.0 |
| Ex. LII | 91 | 25.0 |
| Ex. LIII | 91 | 27.0 |

The results in Tables I and II indicate that the addition of quaternary ammonium salts, described herein, to the compositions of the present invention enhance the ability of the cured coatings to absorb, or transmit to the substrate, dye in the tinting operation as shown by the low values for the percent of light transmission. Moreover, the abrasion resistance and adhesion properties achieved with the unmodified coatings are maintained. It should be noted that certain examples are excluded from Tables I and II. The excluded examples, highlight the instability of certain solventless coating compositions wherein the addition of the quaternary ammonium salt resulted in precipitation of colloidal silica.

Many variations will suggest themselves to those skilled in this art in light of the above detailed description. All such obvious modifications are within the full intended scope of the appended claims.

What is claimed is:

1. A coating composition which forms a tintable, abrasion resistant coating upon radiation curing, said coating composition comprising at least one multifunctional acrylate monomer and a quaternary ammonium salt having the formula $$NR_4^+A^-$$

wherein R is independently a hydrocarbon radical having from 1 to 18 carbon atoms and A is a counterion.

2. The composition of claim 1 which additionally contains a dispersion of colloidal silica.

3. A coating composition which forms a tintable, abrasion resistant coating upon radiation curing, said coating composition comprising:
   (A) at least one multifunctional acrylate monomer;
   (B) a quaternary ammonium salt having the formula $$NR_4^+A^-$$

wherein R is independently a hydrocarbon radical having from 1 to 18 carbon atoms and A is a counterion;
   (C) a dispersion of colloidal silica; and
   (D) a silane selected from the group consisting of amino-organofunctional silanes, acryloxy-functional silanes, glycidoxy-functional silanes, vivyl-functional silanes and mixtures thereof.

4. The composition of claim 1 wherein the multifunctional acrylate monomer is trimethylolpropanetriacrylate.

5. The composition of claim 1 wherein the multifunctional acrylate monomer is a mixture of hexanedioldiacrylate and trimethylolpropanetriacrylate.

6. The composition of claim 1 wherein the quaternary ammonium salt is selected from the group consisting of allyltriethylammonium bromide, trimethoxysilylpropyltriethylammonium chloride, trimethoxysilylpropylpyridinium chloride, N,N'bis(trimethoxysilylpropyl)tetramethyl-1,3-propanediammonium chloride and mixtures thereof.

7. The composition of claim 1 wherein the quaternary ammonium salt is present in an amount of from 0.1 to 20 percent based on the total weight of the composition.

8. The composition of claim 2 wherein the colloidal silica is dispersed in water.

9. The composition of claim 2 wherein the colloidal silica is dispersed in an organic solvent.

10. The composition of claim 9 wherein the organic solvent is isopropanol.

11. The composition of claim 2 wherein the colloidal silica is dispersed in an organic solvent and water.

12. The composition of claim 2 wherein the colloidal silica is present in an amount of from 1 to 70 weight percent based on solids.

13. The composition of claim 12 wherein the colloidal silica is present in an amount of from 30 to 55 weight percent based on solids.

14. The composition of claim 3 wherein the amino-organofunctional silane is selected from the group consisting of N-(2-aminoethyl-3-aminopropyl)trimethoxysilane, 3-aminopropyltrimethoxysilane, 3-aminopropyltriethoxysilane, and anilinopropyltrimethoxysilane.

15. The composition of claim 3 wherein the acryloxyfunctional silane is selected from the group consisting of
3-methacryloxypropyltrimethoxysilane,
3-acryloxypropyltrimethoxysilane,
2-methacryloxyethyltrimethoxysilane,
2-acryloxyethyltrimethoxysilane,
3-methacryloxypropyltriethoxysilane,
3-acryloxypropyltriethoxysilane,
2-methacryloxyethyltriethoxysilane, and
2-acryloxyethyltriethoxysilane.

16. The composition of claim 3 wherein the glycidoxy-functional silane is selected from the group consisting of
3-glycidoxypropyltrimethoxysilane,
2-glycidoxyethyltrimethoxysilane,
3-glycidoxypropyltriethoxysilane, and
2-glycidoxyethyltriethoxysilane.

17. The composition of claim 3 wherein the vinylfunctional silane is selected from the group consisting of vinyltriethoxysilane, vinyltrimethoxysilane and vinyltris(2-methoxyethoxy)silane.

18. The composition of claim 3 wherein the mole ratio of the multifunctional acrylate monomer and the silane is 1:1.

19. The composition of claim 1 which additionally contains one or more UV absorbers.

20. The composition of claim 1 which additionally contains one or more photoinitiators.

21. The composition of claim 20 wherein said photoinitiator is 2-hydroxy-2-methyl-1-phenyl-propan-1-one.

22. The composition of claim 20 which additionally contains one or more oxygen inhibitors.

23. The composition of claim 22 wherein said oxygen inhibitor is methyldiethanolamine.

24. A method for using the composition of claim 1 as a tintable, abrasion resistant coating comprising coating said composition onto a substrate, applying an effective amount of radiation to cure said composition, and then dying the substrate.

25. A method for using the composition of claim 2 as a tintable, abrasion resistant coating comprising coating said composition onto a substrate, applying an effective amount of radiation to cure said composition, and then dying the substrate.

26. A method for using the composition of claim 3 as a tintable, abrasion resistant coating comprising coating said composition onto a substrate, applying an effective amount of radiation to cure said composition, and then dying the substrate.

27. A process for preparing a solventless coating composition which forms a tintable, abrasion resistant coating upon radiation curing, said process comprising the steps of:
   (I) combining
   (A) at least one multifunctional acrylate monomer;
   (D) a silane selected from the group consisting of amino-organofunctional silanes, acryloxy-functional silanes, glycidoxy-functional silanes, vinyl-functional silanes and mixtures thereof;

(II) mixing the product of (I) with colloidal silica dispersed in a solvent;

(III) removing residual solvent at reduced pressure; and thereafter, (IV) adding a quaternary ammonium salt having the formula $NR_4^+ A^-$ wherein R is independently a hydrocarbon radical having from 1 to 18 carbon atoms and A is a counterion.

28. The process of claim 27 wherein one or more photoinitiators is added to the composition prior to cure.

29. A solid substrate having a tinted coating prepared in accordance with the process of claim 27.

30. The composition of claim 19 wherein said UV absorbers are selected from the group consisting of:
bis(1,2,2,6,6-pentamethyl-4-piperidinyl)(3,5-bis(1,1-dimethylethyl-4-hydroxyphenyl)methyl)butylpropanedioate having the structure:

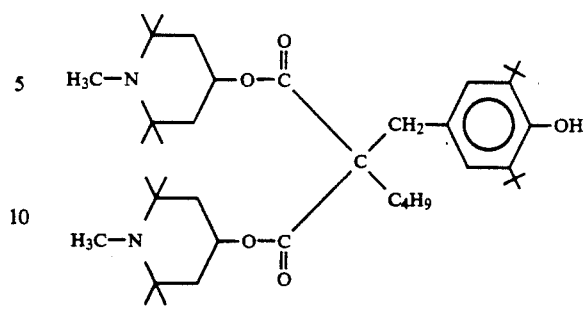

2-ethylhexyl-2-cyano-3,3'-diphenylacrylate;
2-hydroxyl-4-n-octoxybenzophenone;
2-(2'-hydroxy-5'-methylphenyl)benzotriazole;
poly(oxy-1,2-ethanediyl);
alpha-(3-(3-(2H-benzotriazol-2-yl)-5-(1,1-dimethylethyl)-4-hydroxylphenyl)-1-oxopropyl)-omega-hydroxy; and
2-hydroxy-4-methoxybenzophenone-5-sulfonic acid.

31. The composition of claim 20 wherein the photoinitiator is 2,2-dimethoxy-2-phenyl-acetophenone, represented by the general formula: $C_6H_5COC(OCH_3)_2C_6H_5$.

* * * * *